Patented June 24, 1924.

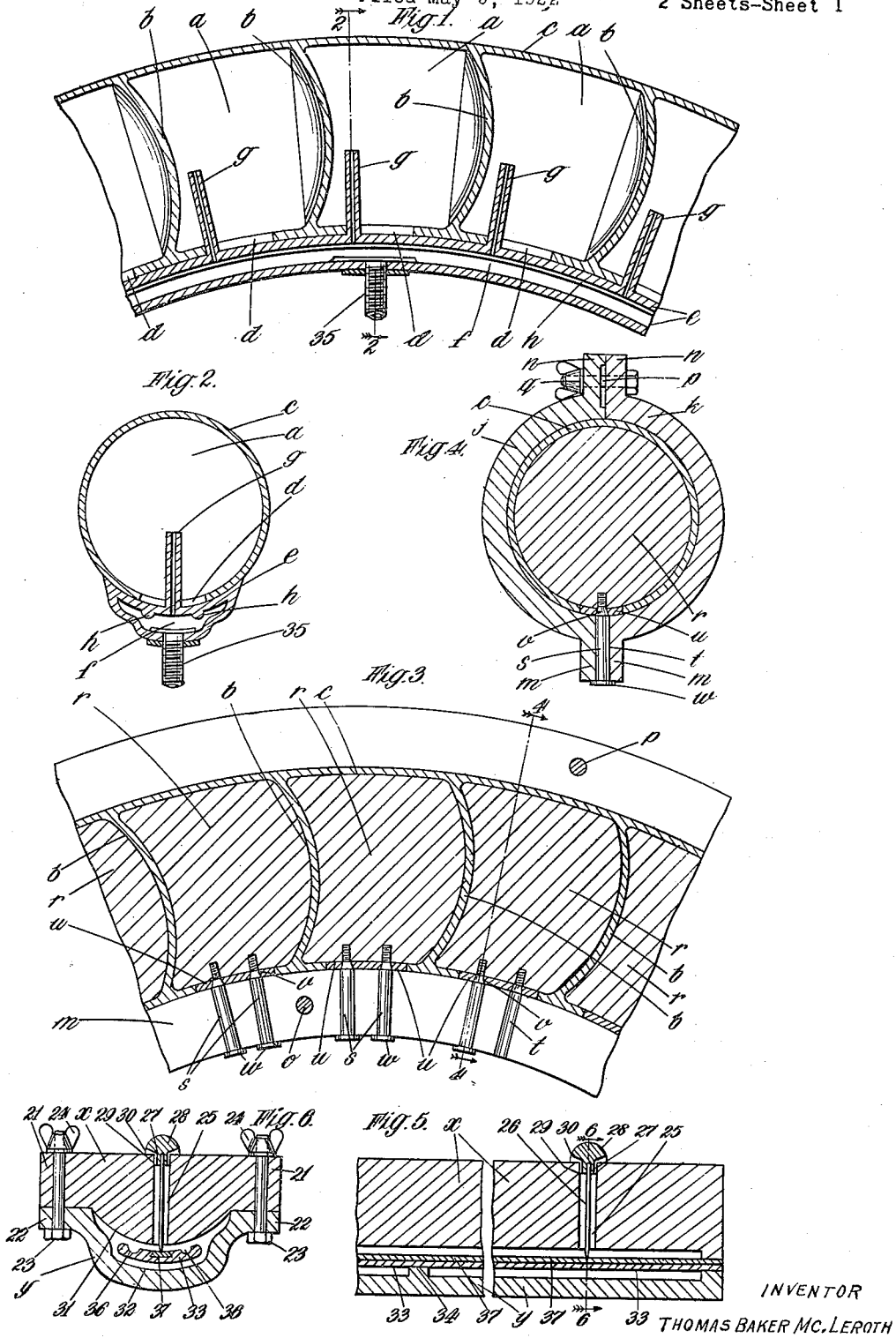

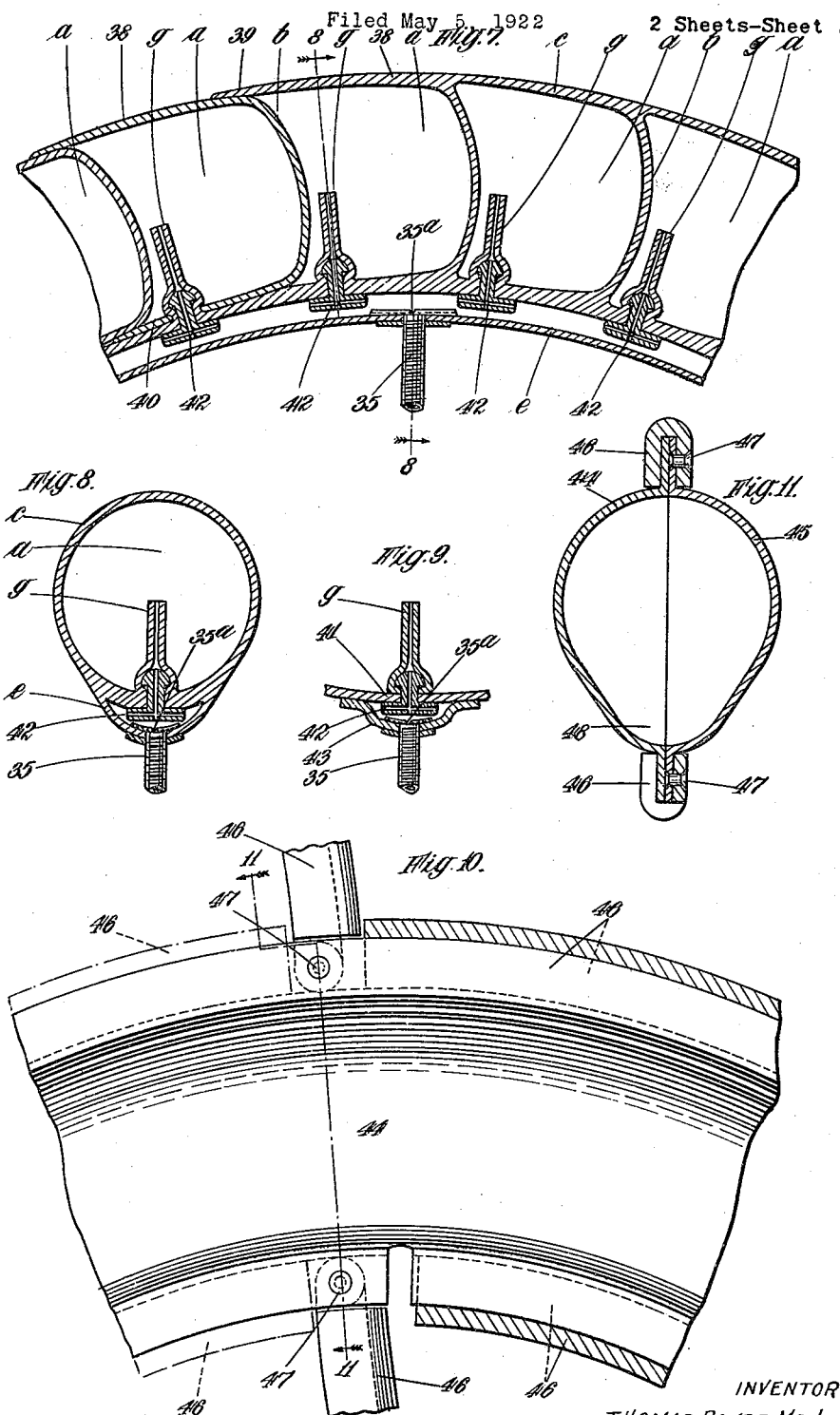

1,498,975

UNITED STATES PATENT OFFICE.

THOMAS BAKER McLEROTH, OF LONDON, ENGLAND.

AIR TUBE FOR PNEUMATIC TIRES.

Application filed May 5, 1922. Serial No. 558,635.

*To all whom it may concern:*

Be it known that I, THOMAS BAKER MC-LEROTH, formerly of Salem, Woodville Road, New Barnet, in the county of Herts, England, and now of "Eastburn," The Crescent, Hadley Woods, London, England, a British subject, have invented certain new and useful Improvements in or Relating to Air Tubes for Pneumatic Tires, of which the following is a specification.

This invention relates to an air tube for a pneumatic tire, of the kind comprising a plurality of sections or compartments so arranged that the puncturing of one section or compartment will not materially affect the efficiency of the tire as a whole.

Air tubes of this kind and moulds for the production thereof are described in the specification accompanying prior British Letters Patent No. 160,942 according to which an air tube for pneumatic tire comprises a series of sections or compartments formed by partitions, and a passage called the feed passage running around the inner periphery of the tube, and communicating with each of said sections or compartments, by way of a valveless rubber feed tube projecting into such section or compartment and adapted, on a section or compartment being punctured, to be squeezed between the partitions and bent over by them and thereby to close the communication between such section or compartment and the feed passage. The tube was preferably made in a straight length and its ends joined subsequently, and it was stated that the feed passage could be formed integrally with the air tube or by a separate portion secured to said tube. The sections or compartments were produced by means of cores which were withdrawn through splits or apertures in the walls of the compartments and these splits or apertures were, according to said prior invention, closed by a band or a series of patches applied thereto when the ends of a length of the tube has been joined to constitute an annulus; and in the forms of the invention described the splits or apertures were arranged at what, in use, would be the tread surface of the tube.

The primary object of the present invention is to facilitate the manufacture of such air tubes and to this end and in accordance with the present invention a tubular strip or patch which constitutes the feed passage is employed to close splits or apertures arranged at what, in use, is to be the inner periphery of the tube.

According to said prior invention the communication between each of the sections or compartments and the feed passage was by way of a valveless rubber feed tube projecting into such compartment, and as described, such feed tubes were moulded integral with the air tube one within each compartment. According to the present invention the several apertured projections may be moulded or otherwise made integral with the tubular strip or patch and adapted to project into said compartments through splits or apertures in the air tube.

The tube of the present invention may be made in a mould comprising two annular sections divided on a substantially, central plane adapted to be clamped together, a plurality of cores in said sections, and means carried by said sections or one of them and (or) by said cores for producing in the tube splits or apertures through which the cores may be withdrawn. The sections are preferably divided on the central plane which corresponds with the central plane intersecting at right angles the axis of rotation of the wheel to which the tube is to be applied. The mold for the tubular strip or patch constituting the feed passage and adapted to serve as a closure for the core-withdrawing splits or apertures may comprise two sections adapted to be clamped together, and a core for the formation of the feed passage, one of said sections being adapted to produce on said strip or patch the required valveless feed tubes, whilst the other may produce an aperture for the inflating valve.

These sections may be straight so as to produce a length of strip or patch, the ends of which must be united when it is applied by solution or the like to the tube, or they may be annular, so as to produce a continuous strip or patch, and in the latter case the core for the feed passage must be a discontinuous annulus so as to be adapted to be withdrawn from the strip or patch.

The core may be positioned within the mould by pins carried by one of the sections and adapted to produce the bores of the feed tubes and it is preferable that said core should be furnished with a cushion or pad of lead or other soft metal into which the points of the pins may embed themselves when the parts are clamped together. After the tube proper and the tubular strip or patch have been moulded and vulcanized the cores are withdrawn and said strip or patch is solutioned to the tube proper.

According to a modification of the present invention the tube proper and the tubular strip or patch, after being built up as separate integers, the tube proper of raw rubber, the tubular strip or patch also of raw rubber, and the valveless feed tubes on the latter of partially-vulcanized rubber, are united by solution or otherwise and vulcanized simultaneously as a single unit without the use of solid cores during that process.

To this end the tube may be built up by arranging cores and discs of raw india rubber alternately in a series (preferably in an annulus), solutioning the edges of said discs, wrapping a sheet of raw rubber around the assemblage, and after the solution has set, withdrawing the cores through slits or apertures made in the sheet of raw rubber either before or after it is wrapped around the assemblage, or left between the edges of the sheet when the latter is applied about the assemblage. Preferably, in order to avoid tearing the raw rubber, the cores are made in sections so as to be collapsable e. g. after the fashion of a boot tree.

Alternatively, the tube with its partitions or diaphragms may be built up from a series of raw rubber cups, the closed end of one of which is inserted into the open mouth of another and so on around the series. The cylindrical wall of each cup is preferably tapered away to a feather edge at the mouth of the cup, and said tapered part is solutioned to the outside of the cylindrical wall of the next cup and so on. The wall of each cup is formed with an aperture through which may project a rubber tube formed integrally with the tubular strip or patch as before.

The tubular strip or patch may be built up by solutioning together at their longitudinal margins strips of raw india rubber the contiguous surfaces between said solutioned margins being treated with French chalk or the like to prevent mutual adhesion, and if desired a further layer or layers may be built up thereon. If desired the building up of these layers may be effected about a mandrel which is subsequently withdrawn. Opposite suitable apertures in one of said strips short lengths of rubber tubing are solutioned by their ends so as to project at right angles from the strip, these lengths of rubber tubing having been partially vulcanized beforehand for a reason which will hereinafter appear.

The invention is illustrated by the accompanying drawings wherein Figure 1 is a section, of one form of tube, on the central plane intersecting at right angles the axis of rotation of the wheel to which the tube is to be applied, Figure 2 is a cross-section substantially on the line 2—2, Figure 1, Figure 3 is a similar section to Figure 1 showing part of the mould for the production of the tube proper, Figure 4 is a cross-section on the line 4—4, Figure 3, Figure 5 is a similar view to Figure 3 showing parts of the moulds for the production of the tubular strip or patch, Figure 6 is a cross-section on the line 6—6, Figure 5, Figure 7 is a similar view to Figure 1 shewing a modified form of air tube, Figure 8 is a cross-section on the line 8—8, Figure 7, Figure 9 is a sectional view of a detail, Figure 10 is a similar view to Figure 3 shewing a modified form of mould and Figure 11 is a cross-section on the line 11—11 Figure 10.

In accordance with the form of the invention illustrated by Figures 1 to 4 the air tube consists of a plurality of compartments $a \ldots$ formed by concavo-convex partitions $b$ in a tube $c$ which has, at that part which corresponds with the inner periphery of the type, apertures $d \ldots$ opening into the several compartments $a \ldots$ The strip or patch $e$ by which such apertures $d \ldots$ are closed is made tubular and constitutes the feed passage $f$ and has one face concave in transverse cross-section as shewn in Figure 2 to conform with the transverse curvature of the tube $c$, further it is preferably formed with tapered or feathered marginal portions. Projecting from and at intervals along the length of said concave face is a series of valveless rubber feed tubes $g \ldots$ adapted, when the strip or patch $e$ is applied to the tube $c$, to project through the aperture $d$, one into each compartment $a$. The patch $e$ has on that face of its bore nearer the rubber feed tubes $g \ldots$ a pair of parallel ribs $h$, $h$ spaced one on either side of the plane in which lie said feed tubes $g \ldots$ and serving to prevent the adjacent ends of the apertures from being sealed by contact between the opposite faces of the feed passage $f$, and if desired these ribs $h$, $h$ may be notched or interrupted or may be replaced by two series of hemispherical or other protuberances (not shown).

The strip or patch $e$ is applied to the tube $c$ so as to close the apertures $d \ldots$, preferably so that the feed tube $g$ in each compartment $a$ lies close against the edge of the aperture $d$ of such compartment $a$ and nearer that partition $b$ the convex face of which is presented to said compartment $a$ and is secured by india rubber solution or other known means.

Such a tube functions in the same manner as the tube described and claimed in the prior Letters Patent aforesaid, and may be more readily produced.

One form of mould in which the tube portion c may be produced comprises two annular sections j, k divided, as shewn in Figure 4, on a central plane which corresponds with the central plane intersecting at right angles the axis of revolution of a wheel to which such a tube is to be applied, each of said sections j, k being of semi-circular cross-section and flanged as at m, n at its edges and provided with bolts o, p and butterfly nuts q or the like, in order that said sections may be clamped together. Within the annulus enclosed by said sections is arranged a series of cores r . . . each of which is curved longitudinally to conform with the curvature of the sections a, has one end convex and the other end concave and has such dimensions and wedge shape that the tube c and partitions b . . . respectively have uniform thickness. Each core r may be held in position within the mould j, k by a pair of pins s s screwed thereunto and extending radially therefrom so that they may be received in grooves t in the mating faces of the inner flanges m, m of the mould sections j, k and these pins preferably pass through and are adapted to clamp against the core a curved plate u corresponding in thickness with the tube c to be produced and adapted to form in the wall of the corresponding compartment a an aperture d through which the core r may be withdrawn. For this purpose the pins s . . . are provided with tapered or like shoulders v . . . engaging the plate u and with heads w engaging the outer edges of the flanges m m so as rigidly to position the plate u and core r.

The form of mould shewn in Figures 5 and 6 is adapted to produce a tubular strip or patch e of substantially uniform cross-section and comprises two straight sections x and y flanged at their edges as at 21, 22 and furnished with bolts 23 and butterfly nuts 24 in order that they may be clamped together. The sections x is formed along its longitudinal centre line with a series of passages 25 therethrough of a diameter corresponding with the external diameter of the feed tubes g to be produced, and in each of said passages 25 is fitted a pin 26 of a diameter corresponding with the internal diameter of said tubes g, each of said pins 26 having a shoulder 27 adapted to fit in a passage 25 so as to centralize the pin 26 and a head 28 to position it longitudinally and if desired the shoulders 27 and heads 28 of the pins may be grooved as at 29, 30 to permit the rubber to spew over. The inner face of a section x is curved transversely as at 31 to conform with the transverse section of the tube c whilst the inner face of the section y is curved transversely to a smaller radius and may be formed with a longitudinal groove 32 along the centre of its width. Midway between the inner faces of the sections x and y a core 33 is disposed and is supported at its ends in the ends of the mould sections x, y and at about the centre of its length by a boss 34 on the mould section y as shewn in Figure 5 said boss 34 being adapted to produce an aperture for the usual inflating valve 35. The core 33 may be flat or concavo-convex in cross-section and is formed with two longitudinal grooves 36, 36 for the production of the parallel ribs h. h. aforesaid and along the centre of its length a lead cushion or pad 37 is secured in a dovetailed or undercut groove. When the pins 26 are inserted in the passages 25 in the section x their points embed themselves in this pad 37 and not only assist in positioning the core 33 but also ensure clear openings at the mouths of the feed tubes g . . .

The two sections x and y of this mould and the core 33 may be annular so as to produce a continuous patch e the concave section y of the mould and the other section x also if desired being made in two parts clamped together.

The core 33 must, in this case, be a discontinuous annulus so that it may be withdrawn through a slit in the patch e by a circular twisting movement. This slit should preferably be so arranged relatively to the feed tubes g . . . that when the annular patch e is applied to the tube c it will lie opposite a portion of the wall of the tube c between two adjacent core-withdrawing apertures d, d so that it may be sealed as and when the patch e is solutioned to the tube c. If desired, however, it would also be possible to withdraw the discontinuous core through the aperture formed for the inflating valve 35, whilst the two sections x, y of the mould may be divided only on the central plane in which lie the axes of the feed tubes g . . .

In accordance with the form of the invention illustrated in Figures 7, 8 and 9, the tube proper c with its partitions b . . . is built up from a series of raw rubber cups 38, the closed end of one of which is inserted in the open mouth of another as shewn at the left hand side of Figure 7, and so on around the series. The cylindrical wall of each cup 38 is preferably tapered away to a feather edge at the mouth of the cup as shown at 39, and said tapered part is solutioned to the outside of the cylindrical wall of the next cup 38 and so on. The wall of each cup 38 is formed with an aperture 40 through which may project a feed tube g formed integrally with the tubular strip or patch e, as follows. A strip of raw rubber 41 having been suitably punctured with a series of small apertures along the centre of its length has introduced through said punctures a series of studs 42 . . . . constructed e. g. as described and claimed in the specification of the concurrent application for British Letters Patent No. 23,409 of 1921. The strip 41 having been treated with French chalk as above set forth is then solutioned at its longitudinal margins to another similarly treated strip 43 (or built up strips) as shewn in Figure 9 and the ends of partially vulcanized lengths of tubing *g* having been solutioned are pressed over the heads of the studs 42 so as to contact with the strip 41.

When the solution has set the strip 41 is solutioned to the tube made up of raw rubber cups 38 . . . in such a position that each length of rubber tubing *g* projects into a section or compartment *a* through an aperture 40 in the wall thereof and so that these apertures are closed by the strip 41 and the edges of the strips 41 and 43 are trimmed off.

The tube *c* is built up as an annulus whilst the tubular strip or patch *e* may be built up as a straight length and applied to the inner peripheral surface of the annular tube *c*, the ends of said tubular strip or patch *e* being butt-jointed and solutioned together.

The assemblage (a non-return inflation-valve 35 having been mounted on the part 43 of the tubular strip or patch *e* said valve being of ordinary construction save that its base is notched as shown at 35ª) is then placed within a mould as shewn in Figures 9 and 10 and comprising two flanged annular sections 44 and 45 divided on a substantially central plane and adapted to be clamped together by clips 46 pivoted at 47, said sections 44 and 45 being so formed, at those parts which correspond with the inner periphery of the tube as to provide a peripheral recess 48 for the accommodation of the tubular strip or patch *e*. After these sections have been clamped together the tube *c* is inflated somewhat, preferably to a pressure of about 20 lbs. per square inch, and the mould 44, 45 is placed in a vulcanizer.

During the vulcanizing process the heat causes the internal pressure to rise, but the tube *c* is restrained by the mould 44, 45 against bursting; the heat also causes the contiguous edges of the built-up portions of rubber to unite as shewn at the right hand side of Figure 7 but as the lengths of rubber tubing *g* have been already partially vulcanized they are able to retain their projecting positions without risk of collapsing and becoming either accidentally closed or united with the adjacent interior walls of the compartments *a*.

Having now particularly described and ascertained the nature of my said invention and in what manner the same is to be performed I declare that what I claim is:—

1. An air tube for a pneumatic tire, comprising a series of compartments having apertures arranged at what, in use, is to be the inner periphery of said tube, a tubular patch secured to said tube and closing said apertures and valveless rubber feed tubes comprising integral parts of said patch and projecting through said apertures, one into each compartment.

2. An air tube for a pneumatic tire, comprising a tube of raw rubber provided with a series of compartments having apertures arranged at what, in use, is to be the inner periphery of said tube, a tubular patch of raw rubber comprising a separate integer and adapted to close said apertures and valveless feed tubes of partially vulcanized rubber on said patch adapted to project through said apertures into said compartments, said tube, patch and feed tubes being arranged to be united and vulcanized simultaneously as a single unit without the use of solid cores.

Dated the tenth day of April, 1922.

THOMAS BAKER McLEROTH.